United States Patent
Wang et al.

(10) Patent No.: US 10,460,613 B2
(45) Date of Patent: Oct. 29, 2019

(54) METHOD AND SYSTEM FOR DISPLAYING AN ALIGNMENT SYMBOL FOR INDICATING DEVIATIONS BETWEEN OWNSHIP RUNWAY COURSE HEADING AND TRACKING

(71) Applicant: HONEYWELL INTERNATIONAL INC., Morris Plains, NJ (US)

(72) Inventors: Guoqing Wang, Beijing (CN); Gang He, Morristown, NJ (US); Rui Wang, Beijing (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 32 days.

(21) Appl. No.: 15/715,811

(22) Filed: Sep. 26, 2017

(65) Prior Publication Data

US 2019/0096270 A1   Mar. 28, 2019

(51) Int. Cl.
*G08G 5/02* (2006.01)
*G01C 23/00* (2006.01)
*G08G 5/00* (2006.01)

(52) U.S. Cl.
CPC ........... *G08G 5/025* (2013.01); *G01C 23/005* (2013.01); *G08G 5/0021* (2013.01); *G08G 5/0047* (2013.01)

(58) Field of Classification Search
None
See application file for complete search history.

(56) References Cited

U.S. PATENT DOCUMENTS

| | | | | |
|---|---|---|---|---|
| 4,283,705 A | * | 8/1981 | James | G01D 7/04 340/973 |
| 4,583,094 A | * | 4/1986 | Mosier | G01C 23/005 340/967 |
| 4,860,007 A | * | 8/1989 | Konicke | G01C 23/00 340/973 |
| 5,248,968 A | * | 9/1993 | Kelly | G01C 23/005 340/961 |
| 5,523,949 A | * | 6/1996 | Agate | G05D 1/0676 701/16 |
| 5,745,054 A | | 4/1998 | Wilkens | |

(Continued)

OTHER PUBLICATIONS

Dr. Maarten Uijt De Haag, "EE6900 Flight Management Systems", obtained from http://www.ohio.edu on Jun. 21, 2017.

(Continued)

*Primary Examiner* — Fekadeselassie Girma
(74) *Attorney, Agent, or Firm* — Lorenz & Kopf, LLP

(57) ABSTRACT

A method and system for use onboard an ownship, the method includes generating on a cockpit display an alignment symbol, track bug, and heading bug to aid to align a track angle and heading of the ownship with a runway course by a pilot; and enabling a pilot to view the alignment symbol, the track bug and the heading bug and to maneuver the ownship to maintain first, an alignment of the heading to the runway course and second, to attempt to align a track angle of the ownship with the runway course by adjustments made to maneuver the ownship in a course of landing by a view of a relative position of each of the alignment symbol, the track bug, and the heading bug to each other to serve as an indicator to the pilot of adjustments needed in the course of landing.

19 Claims, 9 Drawing Sheets

(56) References Cited

U.S. PATENT DOCUMENTS

| | | | |
|---|---|---|---|
| 6,693,559 B1* | 2/2004 | Gyde | B64D 43/00 244/181 |
| 6,885,313 B2* | 4/2005 | Selk, II | G01C 23/00 340/945 |
| 6,995,690 B1* | 2/2006 | Chen | G01C 23/00 340/961 |
| 7,215,256 B2* | 5/2007 | Reusser | G01C 23/00 340/970 |
| 7,852,236 B2 | 12/2010 | Feyereisen et al. | |
| 7,961,115 B2* | 6/2011 | Raje | G01C 23/00 340/425.5 |
| 8,035,547 B1* | 10/2011 | Flanigan | G01C 23/005 244/3.1 |
| 8,392,039 B2 | 3/2013 | He et al. | |
| 8,589,071 B2 | 11/2013 | Feyereisen et al. | |
| 8,831,799 B1* | 9/2014 | Levine | G05D 1/0676 244/183 |
| 9,245,452 B2 | 1/2016 | He | |
| 9,640,081 B2 | 5/2017 | Gannon et al. | |
| 2002/0099528 A1* | 7/2002 | Hett | G01C 23/005 703/13 |
| 2003/0132860 A1* | 7/2003 | Feyereisen | G01C 23/00 340/973 |
| 2003/0193410 A1* | 10/2003 | Chen | G01C 23/005 340/971 |
| 2004/0189492 A1* | 9/2004 | Selk, II | G01C 23/00 340/973 |
| 2006/0161336 A1* | 7/2006 | Wischmeyer | G01C 23/00 701/431 |
| 2007/0179684 A1 | 8/2007 | He | |
| 2009/0326744 A1 | 12/2009 | He et al. | |
| 2010/0168939 A1* | 7/2010 | Doeppner | G05D 1/0676 701/16 |
| 2011/0130897 A1* | 6/2011 | Gladysz, Jr. | B64D 43/00 701/15 |
| 2012/0299753 A1* | 11/2012 | Thoreen | G01C 23/005 340/975 |
| 2013/0066489 A1* | 3/2013 | Hooks | G01S 19/15 701/17 |
| 2014/0222257 A1* | 8/2014 | Wyatt | G08G 5/0021 701/16 |
| 2015/0211883 A1 | 7/2015 | He | |
| 2016/0035227 A1* | 2/2016 | Kumar | G01C 23/00 340/971 |
| 2018/0120850 A1* | 5/2018 | McLees | G05D 1/0202 |
| 2018/0122248 A1* | 5/2018 | McLees | G05D 1/0202 |
| 2018/0335939 A1* | 11/2018 | Karunamuni | G06F 3/0481 |

OTHER PUBLICATIONS

European Patent and Trademark Office, European Extended Search Report for Application No. EP18193325.0 dated Mar. 21, 2019.

Gernot Konrad et al: "Development, Flight Test And Certification Of A Track-Up Synthetic Vision System With Hud-Like Symbology For The Pilatus Pc-12 Ng Airport Moving Map View project Enhanced Ground Proximity Warning System (EGPWS) View project". Avionics Europe Conference & Exhibition, Mar. 22, 2012, XP055564289, Munich, Germany.

* cited by examiner

METHOD AND SYSTEM FOR DISPLAYING AN ALIGNMENT SYMBOL FOR INDICATING DEVIATIONS BETWEEN OWNSHIP RUNWAY COURSE HEADING AND TRACKING

TECHNICAL FIELD

The present invention generally relates to ownship display methods and systems, and more particularly relates to ownship display methods and systems for generating and displaying on an ownship display an alignment symbol on screen for indicating deviations between a runway course heading and tracking of an ownship prior to and on landing of the ownship.

BACKGROUND

During the last segment of a flight of an ownship, the landing phase is generally considered one of the most critical phases for flight safety and operational risk endured by the ownship during a flight. The landing of the ownship requires judgment by the pilot of a host of factors including distance, altitude, effects of wind, and the ownship configuration. During the landing, the pilot needs to maintain the ownship tracking to coordinate with the tracking displayed of the ownship on an ownship cockpit display to the designated runway and this coordination of the tracking with the ownship flight must occur throughout the landing approach and the touchdown with, in instances, the presence of cross-winds. This requires adjustments by the pilot of the ownship flight to establish an appropriate crab angle or a sideslip of the ownship to counter drift in the ownship flight course and heading that may occur. The pilot may, for example, execute a de-crab maneuver when a flare cue is displayed during the approach to align the ownship heading with the runway course or execute this de-crab maneuver at a later period, just before touchdown, if no or not enough prior sideslip technique is exercised during the approach. In addition, the difficulty of such a de-crab maneuver is increased depending on the magnitude of the cross-wind which the ownship experiences during the approach and touchdown; particularly when gusty wind conditions occur and a timely adjustment to the airplane lateral control to compensate for the gusty wind condition is required for a successful landing.

The pilot upon the approach will direct his/her attention to the far end of the runway to try to determine the ownship vertical pitch whereby the pilot uses the far end of the runway as a reference point to determine a flight adjustment or adjustments based on the pilot's judgement and experience of the operational capabilities of the particular ownship to compensate for cross-wind. Additionally, the pilot may rely on a "vertical flare cue" raised to the flight path marker (FPM) to control or decide when to perform a pitch-up maneuver in a vertical direction of an ownship when landing. In a lateral viewpoint during this time the pilot will also use peripheral vision try to perceive the runway centerline movement to perform the additional task of compensating for a heading in a track of misalignment with runway course. However, both these tools are not sufficient aids to assist the pilot and more assistance, especially when there are particularly adverse cross-wind conditions are necessary.

That is, current displays in cockpits do not contain indicators such as an alignment symbol on the display to effectively assist the pilot to maintain alignment of the track and heading of the runway course and to make angular and lateral adjustment to counter cross-winds while the ownship imports to a successful landing and to prevent runway excursions or landing gear damages from misalignments.

Hence, an improved ownship display system and method that displays an alignment symbol to indicate to the pilot a reference of a current and a predicted misalignment between an ownship track angle and runway course heading, and to assist the pilot to make the appropriate lateral, angular and tracking alignment maneuvers with a display or a concurrent display of the heading and tracking symbols of the instrumentation that are currently present on the cockpit display to correct for any misalignment during landing are needed. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A display system for use onboard an ownship is provided for a method of assessing misalignment when landing an ownship, the method includes: displaying an alignment symbol on a display for aiding in a first instance, aligning a tracking angle and a lateral course of the ownship with a runway course by a pilot, and in a second instance, displaying as a cue of misalignment of the ownship from the runway course to the pilot wherein the alignment symbol is configured for viewing as a first display item on a zero-pitch reference line (ZPRL) in a viewpoint of the pilot of a direct line of sight of the pilot on the display.

Further, displaying a heading bug on the display for aiding in aligning a heading of the ownship with a runway course for the pilot, the heading bug is configured for viewing as a second display item on the ZPRL in the direct line of sight of the pilot, wherein the heading bug indicates, by an approximate position to the alignment symbol on ZPRL of the display, a reference of a magnitude of lateral misalignment and displaying a tracking bug on the display for aiding in aligning a track angle of the ownship with the runway course, the tracking bug is configured for viewing as a third display item on the ZPRL in the direct line of sight of the pilot on the display wherein the tracking bug indicates, by an approximate position to the alignment symbol on the ZPRL of the display, a reference of a magnitude of angular misalignment.

Finally, enabling a pilot to use the first, second and third display items for maneuvering the ownship for maintaining first, an alignment of the heading with the tracking of the runway course and second, for attempting an aligning of the tracking angle of the ownship with the runway course by making adjustments in maneuvers of the ownship in a course of landing while viewing in the direct line of sight the first, second and third display items on the ZPRL of the display wherein a relative position of each of the display items to the other serves as an indicator to the pilot of adjustments needed for correcting the lateral and angular misalignment in the course of landing.

Another display system for use onboard an ownship is provided. The display system includes: a sensor system, configured to detect external conditions; a source of ownship flight data; a processor, communicatively coupled to the sensor system, the source of ownship flight data, and a cockpit display, the processor configured to process the external conditions and ownship flight data.

The processor is further configured to: generate on the cockpit display an alignment symbol on a zero-pitch reference line (ZPRL) to aid in a first instance, to align to a tracking angle and a lateral course of the ownship with a runway course by a pilot, and in a second instance, to display as a cue of misalignment of the ownship from the runway course to the pilot; display on the cockpit display a heading bug to aid to align a heading of the ownship with a runway course for the pilot wherein the heading bug indicates, by an approximate position to the alignment symbol on the ZPRL of the cockpit display, a reference of a magnitude of lateral misalignment; display on the cockpit display a tracking bug to aid to align a track angle of the ownship with the runway course wherein the tracking bug indicates, by an approximate position to the alignment symbol on the ZPRL of the display, a reference of a magnitude of angular misalignment; and enable a pilot to use the alignment symbol, heading bug and track bug to maneuver the ownship to maintain first, an alignment of the heading with the runway course and second, to attempt to align the tracking angle of the ownship with the runway course by making adjustments in maneuvers of the ownship in a course of landing while viewing the alignment symbol, heading bug and track bug on the ZPRL of the cockpit display wherein a relative position of each other serves as an indicator to the pilot of adjustments needed to correct the lateral and angular misalignment in the course of landing.

In addition, another display system for use onboard an ownship is provided. A method for presenting information on a display system for use onboard an ownship, the method including: detecting, by a sensor system, external conditions; receiving, from a source of ownship flight data; and at a processor, communicatively coupled to the sensor system, the source of ownship flight data, and a display device, the processor configured to process the external conditions and ownship flight data.

The processor is further configured to: generate on a cockpit display an alignment symbol to aid to align a track angle and lateral deviation of the ownship with a runway course by a pilot; generate a track bug and a heading bug on the cockpit display to aid to align to a track and a heading of the ownship with the runway course; and enable a pilot to view the alignment symbol, the track bug and the heading bug and to maneuver the ownship to maintain first, an alignment of the heading to the runway course and second, to attempt to align the track angle of the ownship with the runway course by adjustments made to maneuver the ownship in a course of landing by a view of a relative position of each of the alignment symbol, the track bug, the heading bug to each other to serve as an indicator to the pilot of adjustments needed in the course of landing.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
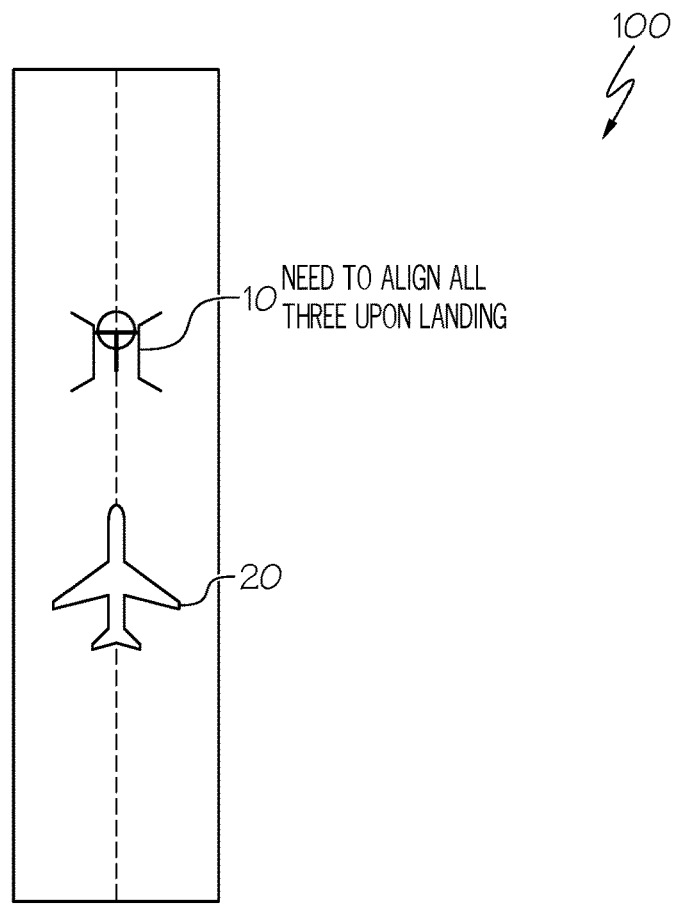
FIG. 1 are illustrations showing the ownship approach and touchdown where the alignment symbol, heading bug and tracking bug are utilized in aligning the ownship, in accordance with various embodiments.
Figure 1:
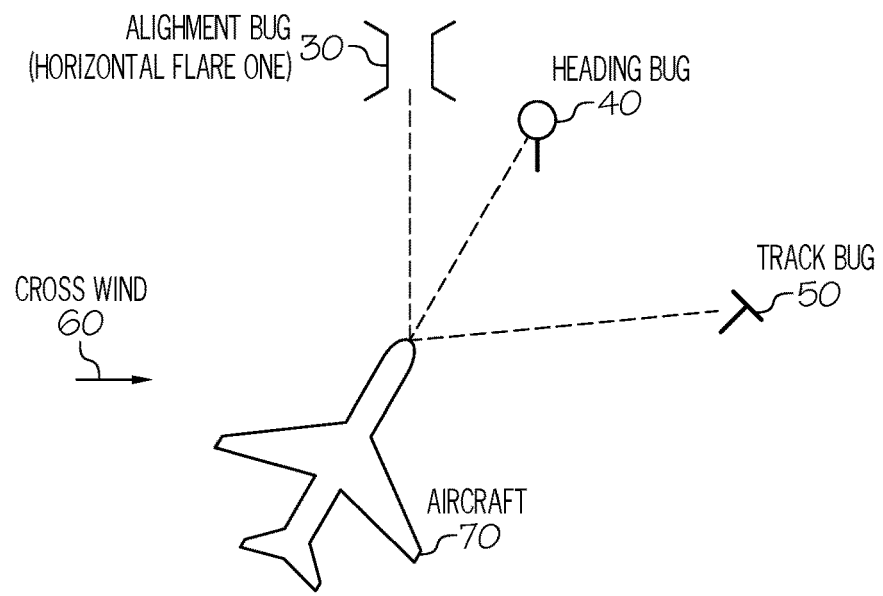

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

During the moments prior to an ownship landing and on touchdown, the pilot must align the ownship tracking with the runway heading and may also have to compensate for cross-winds during such moments. This maneuver is performed by the pilot moments or seconds before the touchdown on the runway by the ownship. Hence, the window for the pilot to perform this maneuver is small, and as such, leaves the pilot with little, if any time to make corrections or adjustments in the maneuver. In other words, the pilot must under some circumstances align both the ownship tracking with the runway heading with lateral and angular adjustments for cross-winds correctly in a mostly single or quick maneuver and further, must do so in the final moments of an ownship landing in order to perform a successful landing operation. Given the lack of an opportunity to make errors in this maneuver, the pilot faces enormous pressure during the final moments of an ownship landing to perform this maneuver with near or absolute correctness. The margin of error is slim given that multiple corrections by the pilot for a misalignment may not be feasible given the time constraints faced when this maneuver should be executed and the rate the ownship is landing and proceeding to a touchdown on a runway where the runway has limitations of a limited breadth and distance.

There is a need for an onscreen graphic alignment symbol on the cockpit display to aid the pilot in aligning the ownship heading and runway tracking during these moments prior to landing to correct for lateral and angular deviations.

There is a need for using another symbol of an alignment symbol with the cues, and tracking and heading bugs already present on the cockpit display for assisting the pilot during the approach and landing in a manner that is convenient, unobtrusive and yet provides the appropriate and meaningful level of assistance to the pilot without detracting from assistance already provided of the cues and symbols in use.

There is a need to coordinate using an alignment symbol as indicator such as a "lateral cue" or a "lateral flare cue" notifying the pilot at earlier time of the lateral deviations and for a pilot to perform various maneuvers including changes in heading and crabbing or de-crabbing maneuvers to compensate for the deviations.

There is a need for the further use of the tracking bug on a display of an ownship track when landing the ownship in a manner that assists the pilot to make compensating maneuvers by visually notifying the pilot by a further reference that the angular deviation has been corrected or that the angular displacements needs correction and how much of a correction is needed based on a predicted trend line of a magnitude of angular deviations.

Further, with such information, there is a need to enable the pilot to know or ascertain, not based on pilot judgment, but by the visual indicators of how much in magnitude an ownship maneuver such as crabbing or de-crabbing maneuver or a slide slip is needed to be establish to make the correction.

Also, there is a need to provide the pilot with an immediate feedback of the predicted trend line on the angular deviation during the moments prior to the touchdown so the pilot can make the necessary adjustments or maneuvers to compensate for any misalignment in the ownship heading and angular displacement prior to the touchdown.

There is a need to provide the pilot with additional graphic assistance visually on when and how to make such adjustments for an intuitive track angle correction on landing. For example, the pilot can be provided with such assistance by viewing within a framework of an alignment symbol which in a particular instance can be considered a cue of the lateral deviations or tracking misalignments indicating an appropriate time to attempt to correct for angular deviation and heading misalignment and a reference of time to touchdown. In addition, a predicted trend line connected to the tracking bug on the display, where based on these entities, the pilot can make judgements to correct for the lateral deviation and then correct for the angular deviation and can visually see by a positioning of the tracking bug and the connected trend line, and the heading bug in relation to the alignment symbol and determine if the adjustments are correct for both the angular and lateral alignment. In addition, can visually see by the magnitude of the trend line about the boundaries of the alignment symbol if the angular deviations have been corrected for conditions such as a cross-wind and safe landing is feasible during the approach but prior to the touchdown.

FIG. 1 are illustrations showing the ownship approach and touchdown where the alignment symbol, heading bug and tracking bug are utilized in aligning the ownship, in accordance with various embodiments. Referring to FIG. 1, a system 100 for generating an ownship orientation cue of an alignment symbol 30 is illustrated in accordance with an embodiment. When landing an ownship 20 on a runaway, the pilot needs to align the ownship heading 40 to a designated tracking by viewing a tracking bug 50 which is displayed on a display of the ownship which is aligned to the designated runway. The appropriate alignment of the tracking bug 50 must occur within a limited range during the landing approach or prior to the touchdown with a more precise aligning occurring on the touchdown of the ownship 20 on the runway. There are environmental conditions that cause impediments to a precise alignment and in particular, the condition or presence of cross-winds 60. To counter the cross-winds 60 requires adjustments by the pilot of the ownship during the ownship flight on approach, where the pilot in making the adjustments may be assisted by using an alignment symbol 30. This enables the pilot to establish an appropriate crab angle or a sideslip of the ownship to counter drift in the ownship course caused by the cross-winds 60 and/or an incorrect ownship heading 40. In addition, there may also be angular deviations; in response, the pilot may, for example, establish a crab or de-crab maneuver which is used and often required when notified by a lateral flare cue on the cockpit display indicating angular deviation when landing. The flare cue notifies to look for the trend line for the magnitude of angular deviation and the pilot after correcting for lateral deviation by aligning the heading bug 40 to the tracking bug 50 of the ownship, the pilot then corrects for angular displacement as much as possible prior to touching down on the runway whereupon at touchdown all three entities of the alignment symbol 30, tracking bug 50 and heading bug 40 are rendered in manner where the framework of the region of the alignment symbol is shown to contain the tracking but which indicates that all three entities are aligned.

Figure 2:
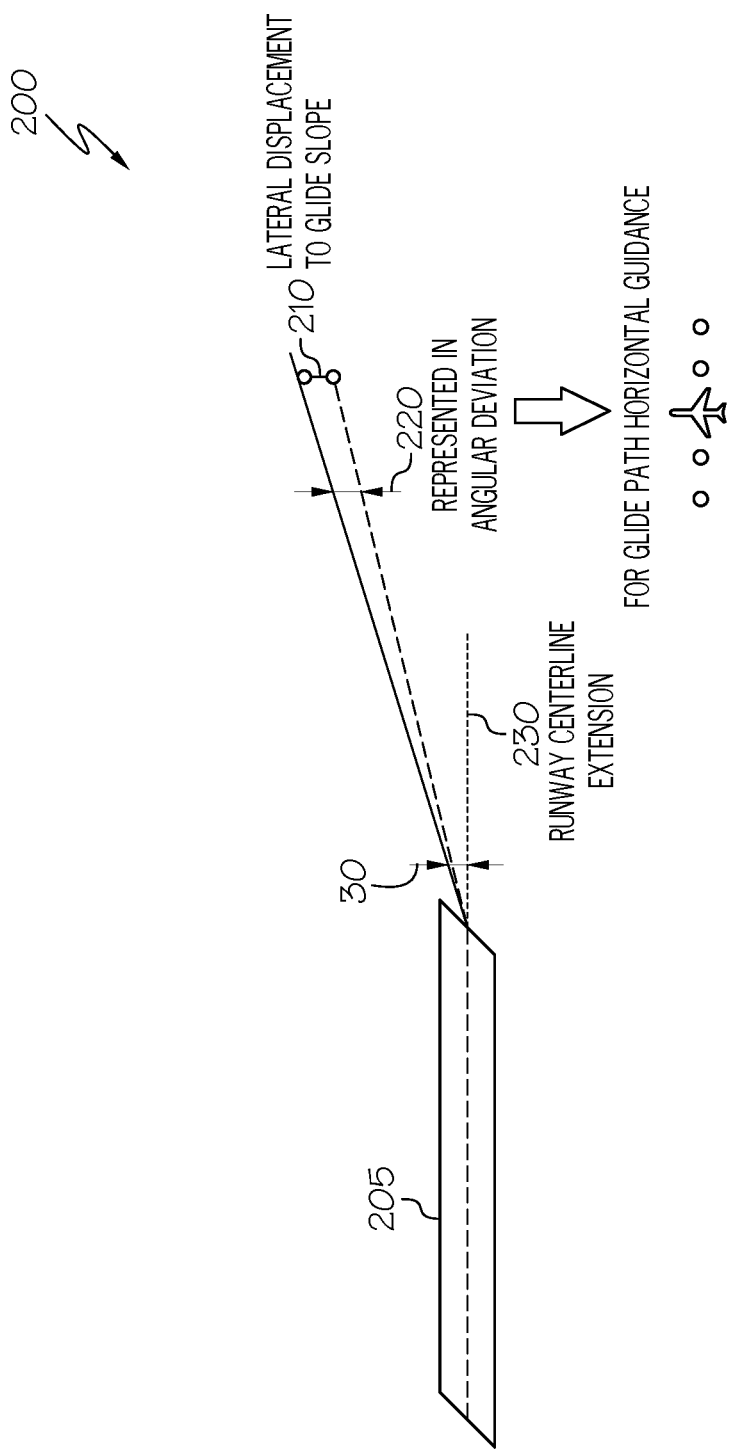
FIG. 2 are illustrations of a related art showing the ownship approach and touchdown and deviations in angular and aligning the ownship, in accordance with various embodiments.

Referring to FIG. 2 of a related art, in order to land within a given area on the runaway, the pilot operates the ownship along a flight path to the runway 205. For guidance to the runway 205, the pilot may guide the ownship flight path in a line which aligns with a centerline of a runway centerline extension 230. The runway centerline extension 230 is generated on the display by various processors of or connected to a system of flight management of the ownship. The lateral displacement of a glide slope 210 of the ownship has an angular displacement of approximately 30 degrees for a linear curved approach to the runway 205. The pilot for example may align the ownship with the runway centerline extension 230 to correctly position the ownship heading upon touchdown. The centerline of the runway 205 like the runway centerline extension 230 may be internally calculated by processors and solutions of the ownship in association with the ownship flight management system. The processors of the ownship may also correlate the ownship position using the flight management system of the ownship with runway location data to compute the ownship particular locations with respect to particular runway locations upon approach and touchdown.

Figure 3:
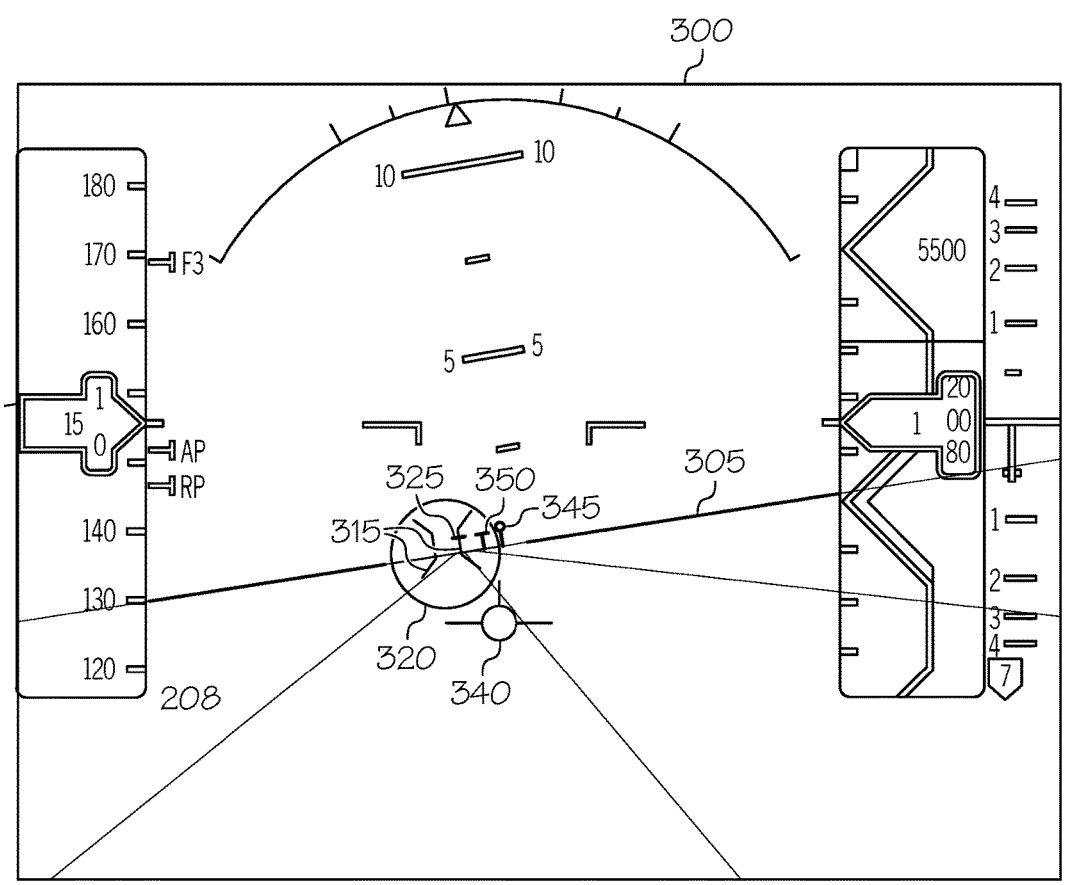
FIG. 3 are illustrations showing a graphical display with examples of how an ownship alignment symbol may be rendered, in accordance with various embodiments.

FIG. 3 illustrates the alignment symbol in accordance with an embodiment. The alignment symbol 320 which been positioned on a zero-pitch reference line (ZPRL) 305, and a predicted trend line 325 of a horizontal track angle extends from the tracking bug 350 which is referred to in FIG. 3 according to an exemplary embodiment. The alignment symbol 320 is positioned on the ZPRL 305 together with tracking bug 350 and also there is within a direct view a heading bug 345. The alignment symbol 320 is displayed on a cockpit display 300 with the tracking bug 350 and the heading bug 345 so that the pilot can view all three items at once in a direct view region and determine a spacing part of the items for coordinating adjustments in the ownship flight or glide slope to merge the items together in a manner that represents an alignment between all three items. The combination of the three different items or entities of the bugs merging with the symbol is enabled in a manner to be easy to distinguish between each other with the different entities having differences in relative geometrical shapes and configurations. Additionally, a flight path marker (FPM) 340 is shown were a lateral flare cue (not shown) below may be displayed just prior to a flare maneuver at an approximate elevation of the ownship of about 100 ft above the field elevation. This lateral flare cue will, in a subsequent manner, be raised on the display to at, an instance, coincide with the FPM 340, which may indicate an appropriate time for the pilot to execute a flare maneuver of the ownship for a smooth landing. In contrast, the alignment symbol 320 will or may be displayed earlier in the flight of the ownship prior to the lateral flare cue displayed. That is, the alignment symbol 320 may be displayed when the ownship is at a greater than 100 ft. elevation which is ordinarily the period when the lateral flare cue is displayed; and therefore, provide at an earlier time to the flight crew an indication which may be, in instances, be a distinct indication that the track angle and heading of the ownship are misaligned or trending to a misalignment to the runway course. In addition, given this earlier notification, the pilot may not or for that matter, need not align the ownship to correct for the misalignment. Hence, given the earlier notice, by the earlier display of the alignment symbol 320 to the flight crew, the pilot has the option to not to align the ownship or keep the ownship intentionally misaligned and not make the compensations for crosswind or capturing the runway centerline as the pilot can make the needed adjustments at a later time. However, at the period of a final moment of approach, the pilot must align the ownship correctly with for example, a flare maneuver to the a right or left before the landing or touchdown. That is, the ownship track angle should be aligned to the runway course and also the ownship heading should be aligned to the runway course for a landing deemed to be within a safe condition. A safe condition includes an appropriate rollout of the ownship and no damage to the landing gear, veering off the runway etc. The alignment symbol 320 when used in this manner as an indicator to the flight crew may be considered or called a "lateral flare cue" as the alignment symbol 320 may serve as a cue to the flight crew of a lateral misalignment on an approach of a landing of the ownship.

In an exemplary embodiment, the alignment symbol 320 may include different trend lines or predictive trend lines of the heading bug 345 and tracking bug 350. However, additional trend lines displayed should be balanced and prioritized to avoid clutter to the cockpit display 300.

Further, it is easy to tell the differences between each entity by the pilot upon viewing each item directly as the heading bug 345, the tracking bug 350 and the alignment symbol 320 have recognizable differences when viewed in geometric shapes of the bugs and the symbol, and this is especially helpful when all three are displayed together on a cockpit display or heads up display. Further, because of the distinctive characteristics of the items, the pilot can view easily on the display movement of each item towards or away from the desired alignment as referenced by the alignment symbol 320.

Although a cockpit display 300 screen may be used to display the above-described flight information symbol, bugs and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.). In addition, the heading bug 345, the tracking bug 350 and the alignment symbol 320 may be further differentiated by different color types.

As explained, the alignment symbol 320 when displayed is used with a period of rendering as a lateral flare cue for indicating or for making heading adjustments. That is, when the pilot views the alignment symbol 320 the pilot will intuitively know to look for making alignment adjustments and will have a reference for the time of the touchdown earlier to the cue reference of the vertical flare cue. In addition, the pilot will intuitively know, while correcting for lateral deviation, to start to correct for angular deviation. In an exemplary embodiment, given, the alignment symbol 320 being displayed, the pilot will or may follow an alignment correction process of, once the lateral deviation has been corrected, intuitively look to make angular corrections for the angular deviation. The pilot will most likely attempt to establish a sideslip for a glide path and execute compensation adjustments by a crabbing or a de-crabbing maneuver of the ownship to compensate for angular displacements of the cross-wind. During this flight phase the heading bug 345 will move towards the alignment symbol 320 indicating to the pilot that a touchdown is approaching and when the touchdown occurs the heading bug 345 will be positioned within a pair of lines 315 which may be symmetrical parallel segments of the alignment symbol 320. In additional, the tracking bug 350 will be positioned with the pair of lines 315 to indicate a correct tracking of the runway course.

In addition, a predicted trend line 325 of the tracking bug 350 which is likely within the region of the alignment symbol 320 (but may cross the boundaries of the alignment symbol 320 depending on the magnitude of the predicted track angle misalignment and angular displacement of the ownship). The predicted trend line 325 will indicate to the pilot of the magnitude of an angular control adjustment and movement towards an aligned position. That is, the predicted trend line 325 will indicate the magnitude of the angular displacement and the pilot will adjust the right or left rudder to compensate for the back and forth of the predicted trend line 325 from the right and the left side of the tracking bug 350. If the magnitude of the predicted trend line 325 decreases or it is visually abridged and an extension of the predicted trend line 325 is within the region of the alignment symbol 320 during the approach and landing, the pilot will be given notice that a safe condition exists for a touchdown.

As explained, the alignment symbol 320 like the heading bug 345 appears at a similar time or instance and indicates a control reference during the ownship approach and landing but the heading bug 345 is positioned closer and then within the alignment symbol 320 at touchdown. The pilot has a reference to assist in identifying when to start making the lateral adjustments needed for the ownship by the reference markings of the heading bug 345 and the alignment symbol 320 on the cockpit display 300. The heading bug 345 and tracking bug 350 will also need to be aligned with the alignment symbol 320 at the approach and prior to the landing and further if not aligned properly, a last-minute adjustment by the pilot to correct the runway course heading of the ownship should be made. The predicted trend line 325 is helpful to the pilot in ascertaining the magnitude of the needed later correction and once correct, the tracking bug 350 and extensions or abridgments of the predicted trend line 325 will be positioned within a range of the sides of the alignment symbol 320 on the cockpit display 300.

The magnitude or amount of adjust may depend on the offset between the ownship heading and tracking angles and the pilot landing approach and techniques to counter a cross-wind during the landing. The lateral control desired for a particular track angle follows adjustments by the pilot for runway course tracking which enables or allows for a more stabilized approach and landing. Hence, the pilot adjusts for offsets in the runway course heading and then makes angular and lateral adjustments for the cross wind and drift encountered during the approach. As mentioned, sometimes these adjustments prior to touchdown may not be sufficient for proper alignment because much is relied upon by external factor as the non-linear or gustiness of the cross-wind and additional last minute adjustments on landing is required to align the ownship to the runway heading and not to deviate in a direction off the runway. In an exemplary embodiment, the alignment symbol 320 may be formed by a pair of symmetrical parallel segments of lines 315. That is, the alignment symbol 320 is designed with human factor considerations in accordance in the appropriate design and evaluation of flight deck symbols.

In a Federal Aviation Administration (FAA) Report of December 2016, DOT/FAA/TC-16/56, DOT-VNTSC-FAA-17-02 in section 3.3 with respect to "symbols" the report states "to minimize confusion or misinterpretation, symbols should be easy to discern, consistent within the cockpit, and learned with minimal training. Symbols should be positioned with sufficient accuracy to avoid interpretation errors or significantly increase interpretation time. Symbols should not have shapes, colors, or other attributes that are ambiguous or could be confused with the meaning of similar symbols". Hence, the alignment symbol 320 is formed with two symmetrical segments with or without tails of the lines 315 and positioned and generated in a manner to meet the above prescribed criteria of minimizing confusion and ease of discernment. Additionally, the alignment symbol 320 is of a design and shape that the symbols is used for only one purpose within the flight deck and can be by its use and time of display be clearly shown that the pilot can quickly and consistently recognize, interpret, and respond correctly without incurring excessive pilot workload. Also, the alignment symbol 320 is displayed with a symbol priority when displaying the symbol and overlaying another symbol by editing out the secondary symbol, to ensure higher priority symbols remain viewable.

The width of the pair of lines 315 of the alignment symbol 320 may represent the safety margin of misalignment to a selected runway determined by the geometry of the runway and ownship specific data. A processing unit (described in further detail later in the disclosure) for the inputs to the cockpit display which are combined is aligned so that display elements of the lines 315 of the alignment symbol 320 are displayed with a flight path vector symbology which are conformal (i.e., the position and motion are aligned and scaled). Further, a proper combiner alignment by the processing unit is needed to match conformal display parameters as close as possible to the outside real world, depending on the intended function of those parameters. The alignment symbol 320 is layered in the cockpit display 300 in a manner that is least obtrusive but still allows for functionality of assisting the pilot in aligning the heading and tracking of the ownship with the other bugs and symbols on the display. That is, the lines 315 of the alignment symbol 320 and characteristics thereof do not have distracting gaps, geometric distortions (such as squiggles or skews) or motion anomalies discernible from the design eye position viewing envelope which cause erroneous interpretation. The alignment symbol 320 has attributes that use scaling and dynamics generated by the processing unit processed appropriately for the performance level of the ownship.

The bias between the alignment symbol 320 and the runway centerline on the display implies lateral displacement of the ownship to the center of the runway. However, this may not always be the case and it is necessary for the pilot to view with care the alignment symbol 320 and the centerline of the runway to avoid misleading information due to ownship positioning accuracy or database integrity, and further the indication should be consistent with lateral deviation of the localizer (LOC) deviation bar of the instrument landing system (ILS) if applicable and transmitting at this instance to the cockpit instrumentation. The LOC transmits two tones, one to indicate to ownship flight to the left and the other to indicate to ownship flight to the right and corrections can be made by the pilot in accordance.

Figure 4:
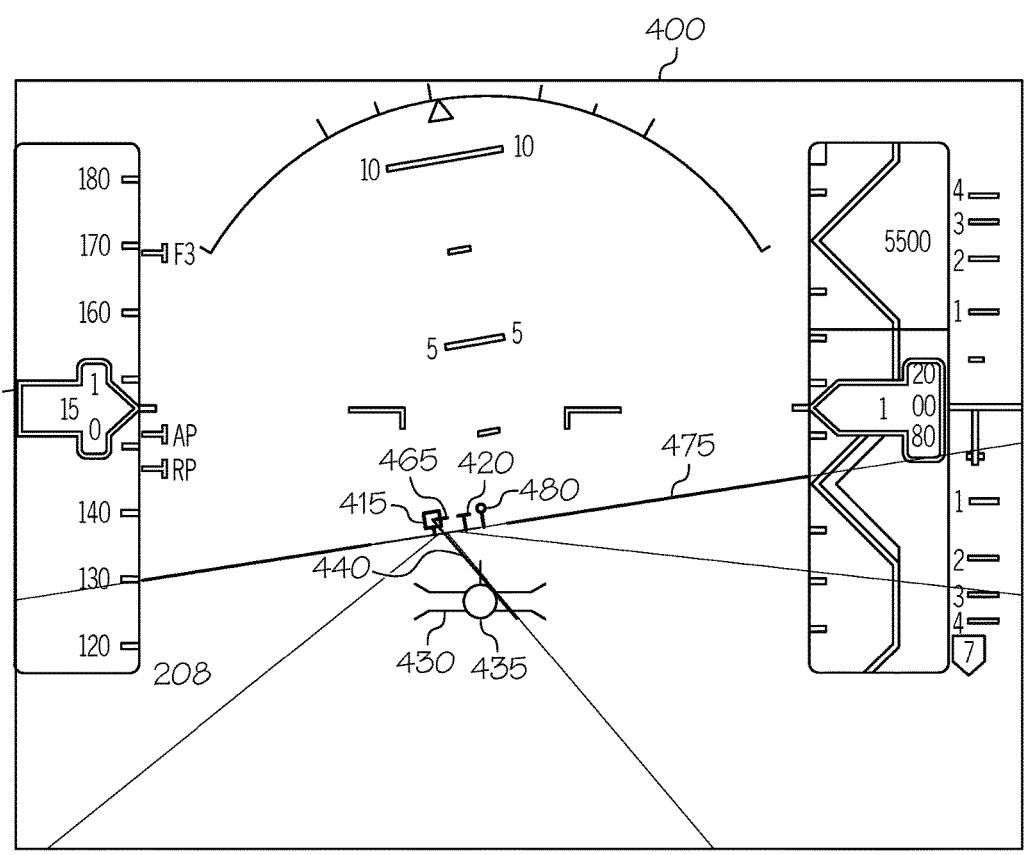
FIG. 4 are illustrations showing a graphical display with examples of how an ownship alignment symbol may be rendered, in accordance with various embodiments.

In FIG. 4, the trend line 465 of the ownship tracking is continued from the tracking bug 420 to the alignment symbol 415 on the ZPRL 475, which can be used to indicate the predicted track angle which will occurs in a subsequent time. During, for example, a flare right maneuver of the ownship before landing, the end of the trend line 465 may indicate a track angle for the ownship upon touchdown. This track angle may also be determined by the ownship energy states and a dynamic track angle rate. The ownship may reach the end of the runway trend line 440 within a time of approximately six seconds which may be predicted in advance using various solutions of processing unit associated or of the flight management system and such predictions may occur during the approach flight phase or at other flight phases of the ownship path.

The alignment symbol 415 is shown in relation to the tracking bug 420 and heading bug 480. In addition, the vertical flare cue 430 of the FPM 435 is shown in relation to the alignment symbol 415. Here, the alignment symbol 415 is of a similar design to the tracking bug 420 to allow for an easy overlay over the tracking bug 420 when the ownship tracking is adjusted correctly.

In addition, the trend line 465, in accordance with an exemplary embodiment, is designated in a green color on the cockpit display, this color may vary in accordance with the magnitude of the misalignment determined by the processing unit of the flight management system which occurs upon the approach or landing, and can be changed in color to indicate a greater or lesser amount of deviation. This color variation of the trend line 465 is designed, such that timely visual alert can be issued for hazardous condition.

While in FIG. 4 another possible alignment symbol 415 design is illustrated, it is contemplated that many other variations in style and design of the alignment symbol can be generated which allow for notification that heading and the lateral correction of the ownship are properly aligned upon landing as well at the predicted trend line is with a safe region for a landing. In other words, other designs of the alignment symbol 415 are permissible which allows for a reference that the heading bug 480 and the tracking bug 420 and trend line 465 are aligned or are within the framework of the alignment symbol 415. With the alignment symbol 415 in a consistent style which fits with the heading and tracking bugs, referred in FIG. 4, the safety margin may would be represented in similar way as the distances between the alignment symbol 415 and the tracking bug and the heading bug. During flight guidance operations, the alignment symbol 415 which may be considered a flight guidance symbol would have occlusion priority. That is, the flight guidance symbol of the alignment symbol 415 would not obscure or cover other primary flight information as determined by various applications of the processing unit of the flight management system. The cockpit display guidance symbol of the alignment symbol 415 would also by its design not excessively interfere with pilots' forward view, ability to visually maneuver the airplane, acquire opposing traffic, and observe the runway environment.

Figure 5:
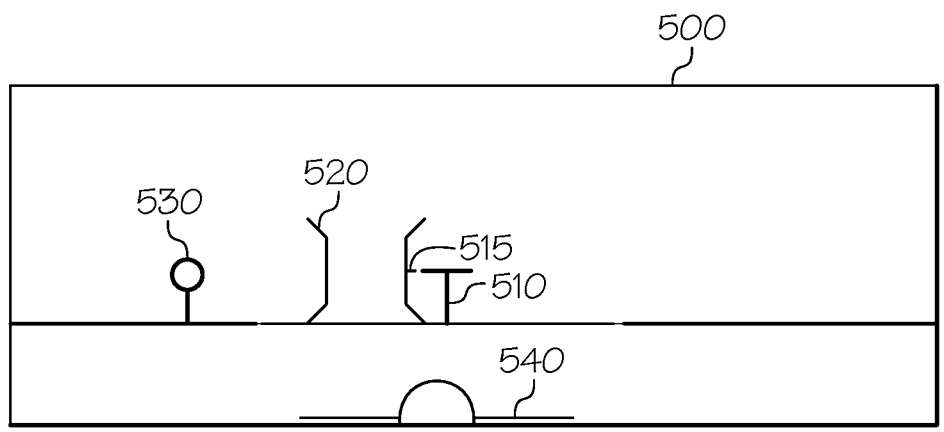
FIG. 5 are illustrations showing a graphical display with examples of how an ownship alignment symbol may indicate a particular misalignment of the ownship, in accordance with various embodiments.

FIG. 5 illustrates a manner that the alignment symbol 520 assists the pilot in the ownship operation during landing. At an initial stage of the final approach phase of the ownship flight, an adjustment of a crabbing angle is determined by the pilot for the ownship to compensate for a cross-wind correction. At this final approach phase, the runway for the touchdown may appear as a relatively small element on the cockpit display which is calibrated or a parameter matched to real world environment to show the element in accordance with a distance and a corresponding size on the display. Hence, the lateral movement necessary for the ownship to align with the runway given the distant proximity of the runway is likely not visually obvious to the pilot. Further, at this distance and phase in the ownship flight, even with the runaway centerline extension displayed, the pilot may not be able to discern the proper adjustments and amount of lateral positional deviation of the ownship.

The use of the alignment symbol 520 in relation to the heading bug 530 is helpful to the pilot given the limited visual ability to give guidance to look for ownship lateral deviation. However, at this instance, even though the distance is too great for effective correction of lateral deviation, the pilot may be able to make corrections in the ownship heading in accordance with the tracking bug 510 as it is readily more visible for runway deviation. In the approach 500 of FIG. 5 there is shown a sufficiently compensated cross-wind with no track angle drift by the positions of the heading bug 530 with the alignment symbol 520 and no significant lateral deviation between each of them since the trend line 515 is not apparent at this instance. Even though there is no cross-wind, the track angle by the tracking bug 510 is not well aligned with the runway course and the pilot may expect a slow lateral movement of the runway which is visually viewed in the course of approaching the runway to intercept the localizer (LOC) of the instrument landing system. The vertical flare cue (not shown) near to the FPM 540 is visible at this instance indicating to the pilot there is a pitch up needed of the ownship.

Figure 6:
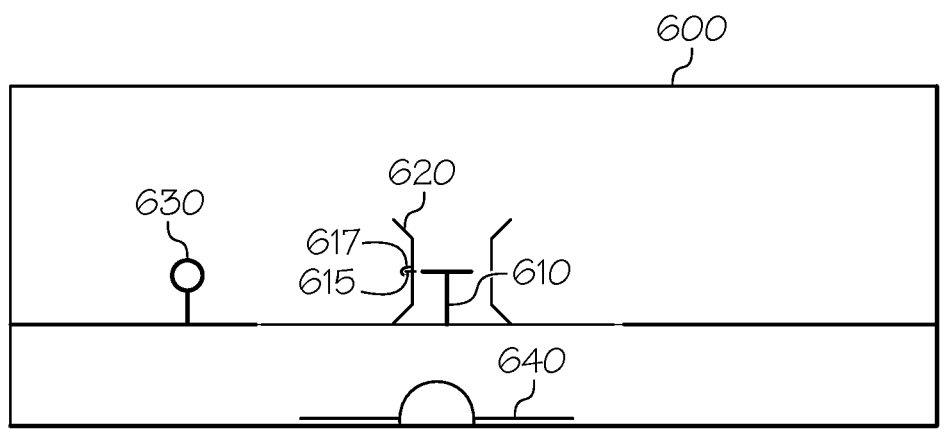
FIG. 6 are illustrations showing a graphical display with examples of how an ownship alignment symbol may indicate a particular misalignment of the ownship, in accordance with various embodiments.

In FIG. 6 after aligned with the lateral component of the instrument landing system (ILS) for the runway centerline and when combined with the vertical glide slope from the localizer (LOC) indicating a right or left direction of flight, the pilot increases the crabbing angle of the ownship using either the left or right rudder to align with the runway course. The ownship track angle and the runway track angle coincide in an adjacent configuration of the tracking bug 610 with in the region of the alignment symbol 620 which indicates the ownship heading by the heading bug 630 is aligned. Hence, the tracking bug 610 when within the area of the framework of the alignment symbol 620 on the zero-pitch line visually indicates to the pilot that the ownship heading is correct. The vertical flare cue near to the FPM 640 is visible at this instance indicating to the pilot there is a pitch up needed of the ownship. The alignment symbol 620 may serve as a lateral flare by the misalignment with the heading bug 630 and tracking bug 610 and that the ownship crab angle needs to be corrected.

The pilot adjusts for the crab angle by monitoring the trend line 615 which is shown on the left side of the edge of the alignment symbol 620. This indicates to the pilot, that there is likely an over compensation for the cross wind that will need to be adjusted for subsequently. Hence, during the lateral flare maneuver, that is when the alignment symbol 620 is used by the pilot as a lateral flare cue, the pilot may apply the right rudder for de-crabbing. As the heading bug 630 is heading towards the alignment symbol 620 and the tracking bug 610 senses a track angle rate to the right which is shown by the trend line 615. That is a vector 617 of the trend line 615, identified in this instance in a green color predicts there may be excessive ownship track angle in the near future requiring pilot adjustments to counter a subsequent runway course misalignment upon the ownship main gear touching. This vector 617 of the trend line 615 notifies the pilot that additional action to adjust the ownship track angle is warranted or may be necessary. The pilot or copilot monitoring the display would be notified visually of the predicted unsafe condition by viewing or focusing on the alignment symbol 620 in particular and not have to make a judgment determination that the condition is predicted to be unsafe. In other words, by viewing the vector 617 of the trend line 615 outside the range of the alignment symbol 620, the pilot would not have to rely on pilot judgment but be given a notification on the display that the condition is likely going to be unsafe.

More precisely, in instances, when the track angle rate of the ownship is only slightly excessive, pilot judgment is required to determine if a safe landing can be executed, within a margin of error and the ownship will not suffer any damage to the landing gear. If on the display, the vector 617 of the trend line 615 predicts excessive track rate and this vector crosses the bound of the alignment symbol 620, then the pilot can be trained to make the adjustment as the track rate is predicted in advance or deemed unsafe and not feasible for a correctly executed touchdown. The pilot can with this notification, not rely entirely on pilot judgment, make finer adjustments in de-crabbing maneuvers prior to touchdown and avoid any margin that falls within the unsafe predicted condition range.

Figure 7:
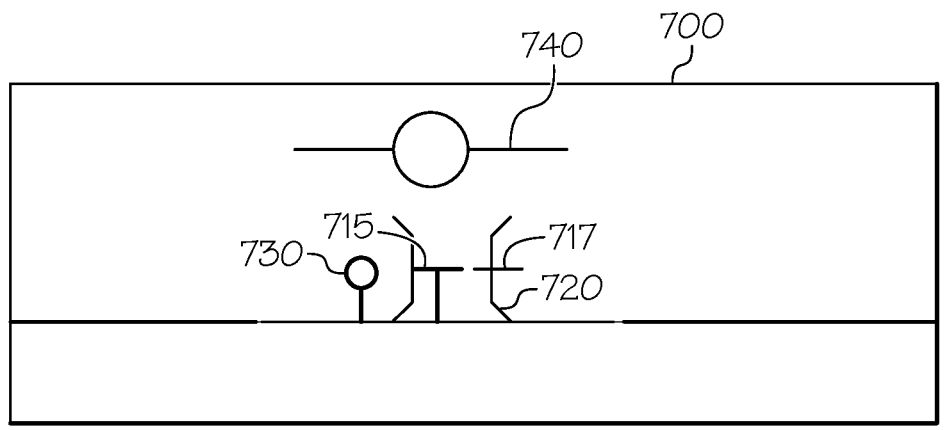
FIG. 7 are illustrations showing a graphical display with examples of how an ownship alignment symbol may indicate a particular misalignment of the ownship, in accordance with various embodiments.

In FIG. 7, the tracking bug 710 is within the boundaries or framework of the alignment symbol 720. The heading bug 730 with the FPM 740 is approaching alignment with the alignment symbol 720 indicating that a touchdown of the ownship is moments away. The vector 717 of the trend line 715 predicts the magnitude of the counter maneuver to correct for the deviation of a prior predicted track angle rate. In this instance, the pilot banks to the left for establishing the slide slip to counter the track angle before the misalignment starts to increase. The heading bug 730 is still aligned with the tracking bug 710. With the slide slip maneuver, the predicted change in the tracking angle will likely decrease or diminish as the ownship approaches touchdown. Hence, a safe landing can be executed without the need for the pilot to make a significant adjustment in ownship heading at the touchdown or an excessive steering of the ownship at touchdown to correct for runway course misalignment. In other words, the pilot has in advance made the proper corrections to prevent a more excessive correction at the touchdown.

Figure 8:
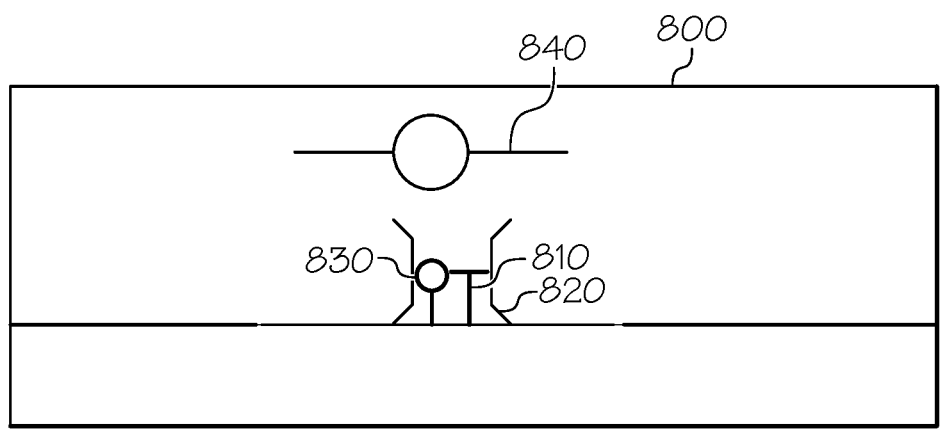
FIG. 8 are illustrations showing a graphical display with examples of how an ownship alignment symbol may indicate a particular misalignment of the ownship, in accordance with various embodiments.

In FIG. 8, the tracking bug 810 and the heading bug 830 are properly aligned at touchdown within the framework of the alignment symbol 820. The FPM 840 also may indicate the ownship has touchdown is also aligned with the framework of the alignment symbol 820. Since the heading bug 830 is properly aligned with the tracking bug 810 no further corrections or steering corrections by the pilot on the ground are necessary. Hence, a safe landing with all three entities properly positioned on the display of the cockpit is shown and the pilot is notified that the landing is within a margin of error and is not unsafe.

Figure 9:
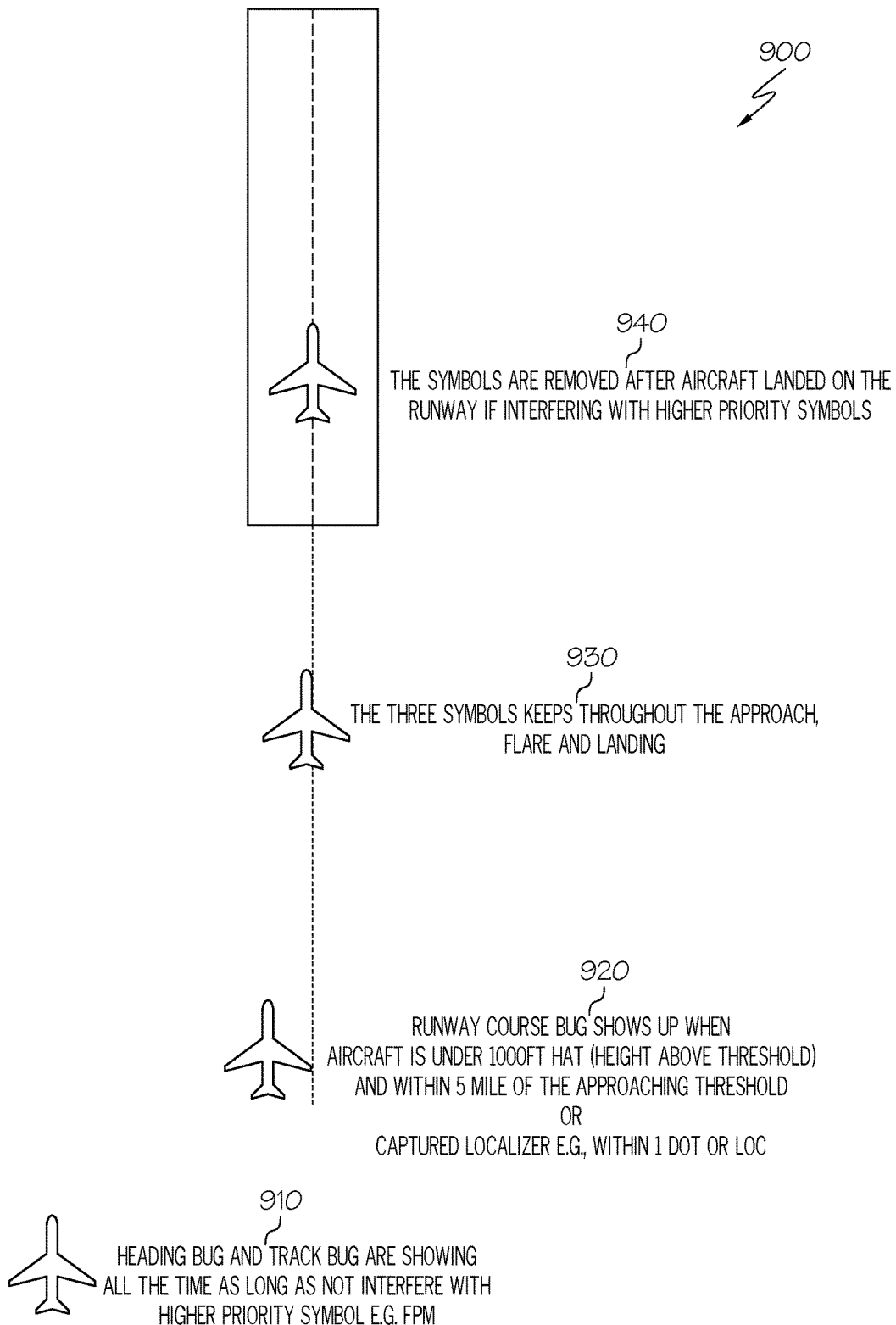
FIG. 9 is a functional diagram illustrating rendering of the alignment symbol and tracking and heading bugs rendered in the approach and landing of an ownship in accordance with various embodiments.

In FIG. 9, the approach and landing sequence 900 of the bugs and symbols is shown. At 910, generally when the runway is not visible or no other higher priority symbols are being shown, the heading bug and the tracking bug are shown on the cockpit display. That is, the heading bug and tracking bug are shown all the time during this stage of the flight so long as higher priority symbols such as feet per minute (FPM) symbols are not visible. At 920, the alignment symbol is display and this may occur at a threshold of an altitude of approximately 1000 feet or less, or defined when the ownship is under a 1000 ft. height above threshold (HAT) and within a five-mile radius of the approaching HAT threshold or, alternately, captured by a localizer (LOC) of the instrument landing system (ILS) (for example within 1 dot or a deviation of 0.5 of the LOC). At 930, once the threshold is met, the alignment symbol and the heading and tracking bugs are displayed on the cockpit display. At 940, once the ownship has landed and a touchdown has occurred, the alignment symbol is no longer displayed if it is determined by internal processors of the ownship that the alignment symbol and/or any other symbols used in the approach and landing interfere with higher priority symbols which are displayed once the ownship is grounded.

Figure 10:
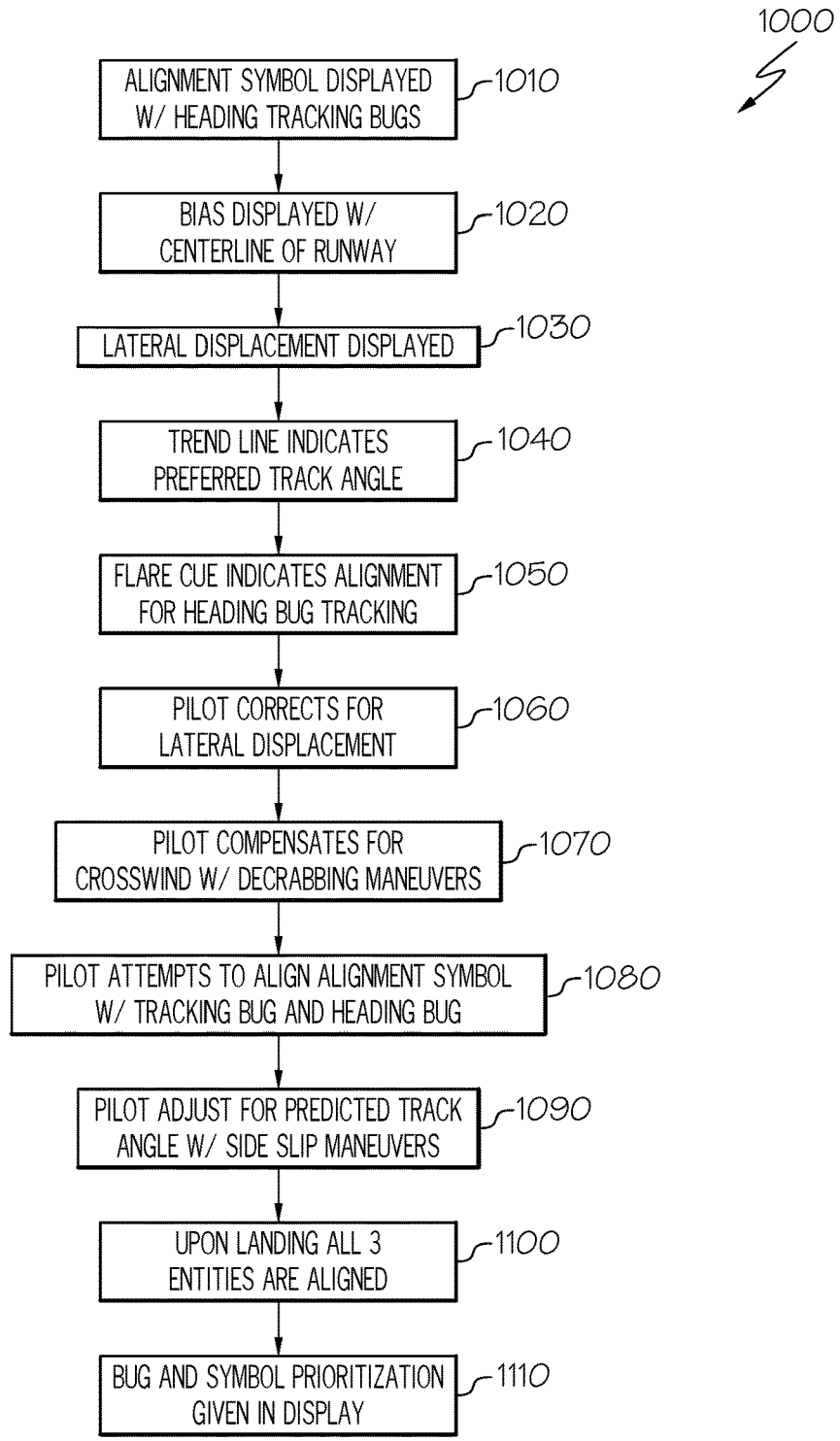
FIG. 10 is a flowchart illustrating a process that may be implemented by the display system in FIGS. 1-9, for displaying an ownship alignment symbol, in accordance with various embodiments.

FIG. 10 is a flowchart illustrating the display flow and interaction with the alignment symbol with the heading and tracking bugs in accordance with an exemplary embodiment. At task 1010, the alignment symbol is displayed on the zero-tracking reference line with the tracking bug. At task 1020, the alignment symbol on the display will provide notice to the pilot of the lateral deviation from the centerline of the runway. The deviation may also be shown with respect an extended centerline on the display generated by processors of the navigation systems of the ownship. Also, the tracking bug and the alignment displayed in association with these entities the heading bug will be displayed. Hence, the three entities of the alignment symbol, the heading bug and the tracking bug will be displayed. Also, a lateral flare cue may be displayed at the time the alignment symbol in task 1010 is displayed. The lateral flare clue will indicate to the pilot to look for the trend line of task 1040 and the predicted track angle deviations from a safe touchdown condition of the ownship.

Further, at task 1050 the lateral flare cue displayed and distance from the alignment symbol will indicate visually to the pilot the time left to adjust for the tracking deviations in course. The pilot at task 1050 will first compensate for the lateral deviation by adjusting the heading bug so the heading bug is in align on the display with the tracking bug. Once, the pilot at task 1060 corrects for the lateral displacement, the pilot will at task 1070 compensate for the cross-wind with crabbing and de-crabbing maneuvers of the ownship. That is, at task 1080, the pilot will attempt to align the alignment symbol with the tracking bug and heading bug and compensate further for the lateral deviation and compensate for a misaligned tracking angle. As the cross-wind conditions, may change upon the approach, the pilot will adjust by banking left or right with the appropriate slide slip to counter the track angle sensed by sensors of the ownship due to the cross-wind. The pilot will monitor the trend line and adjust at task 1090 for the changes in the predicted track angle. The pilot will attempt to keep the predicted trend line or lines within the boundaries or framework of the alignment symbol so that a safe condition on touchdown is ensured and a last-minute excessive steering of the ownship is not needed. Upon touchdown, at task 1100, all three entities of the heading and tracking bug and the alignment symbol will be displayed in alignment. Additionally, the lateral flare cue will also be within the boundaries of the alignment symbol indicating that a touchdown has been achieved. Once the touchdown has occurred, the alignment symbol may or may not be displayed depending at task 1110 the prioritization of the alignment symbol with the other symbols on the display to not obscure more vital symbols of instrumentation necessary to the pilot to maneuver the ownship.

Figure 11:
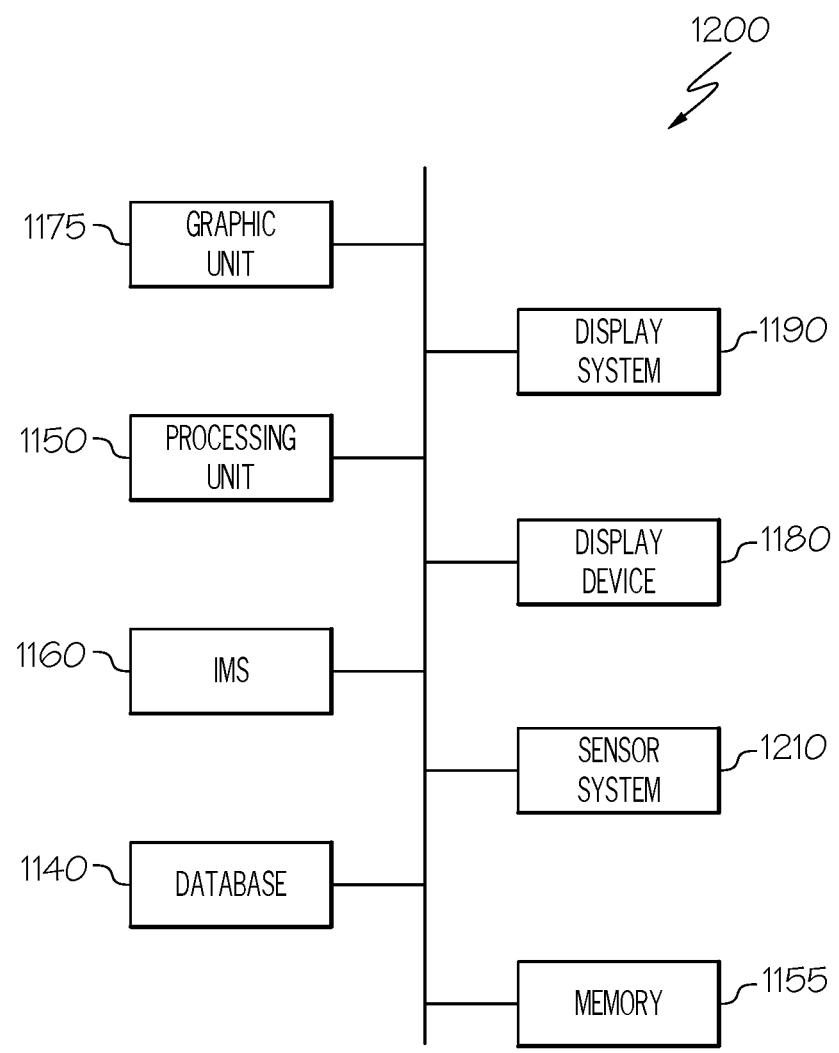
FIG. 11 is a block diagram of an overview of the components of a system for displaying the alignment symbol of an ownship of the display system in FIGS. 1-9 in accordance with various embodiments.

FIG. 11 depicts a block diagram of an ownship visual display of the system 1200 for displaying the alignment symbol in accordance with an embodiment. The system 1200 includes a processing unit 1150, a database 1140, a flight management system (FMS) 1160, a display device 1180, and a sensor system 1210. Although the system 1200 appears in FIG. 11 to be arranged as an integrated system, the system 1200 is not so limited and can also include an arrangement whereby one or more of the processing unit 1150, the database 1140, the flight management system 1160, the display device 1180, and the sensor system 1210 are separate components or subcomponents of another system located either onboard or external to an ownship.

Also, for example, the system 1200 can be arranged as an integrated system (e. g., ownship display system, Primary Flight Display system, a Head Up Display with SVS or EVS as an overlay, a "near to eye display" system, or a head mounted display system, etc.) or a subsystem of a more comprehensive ownship system (e. g., flight management system, navigation and control system, target aiming and control system, collision alert and/or avoidance system, weather avoidance system, etc.). The system 1200 can be utilized in an ownship, such as a helicopter, air plane, or unmanned vehicle. Moreover, exemplary embodiments of the system 1200 can also be utilized in spacecraft, ships, submarines, fixed wing and rotor ownship, such as helicopters, as well as other types of vehicles. For simplicity, embodiments are described above with a reference to an "ownship."

The processing unit 1150 can be a computer processor associated with a Primary Flight Display. Generally, the processing unit 1150 receives and/or retrieves flight management information (e.g., from the flight management system 1160) and landing, approach and/or environment and terrain information (e. g., from database 1140 or sensor system 1210). The processing unit 1150 generates display control signals for a visual display of the flight management information, which includes navigation and control symbols such as the alignment symbol, a zero-pitch reference line, heading indicators, tapes for airspeed and altitude, flight path information, required navigation performance (RNP) information, and any other information desired by a flight crew.

As prior discussed, the processing unit 1150 of the system 1200 may additionally receive and integrate data from the sensor system 1210, and generates display cues, lines and symbols based on the data as well as the flight information. The processing unit 1150 sends generated display control signals to a display device (e.g., the display device 1180) to generate the symbols, cues and lines for viewing by the pilot on the display.

For an offset approach runway, the processing unit 1150 notifies the flight crew of the existence of the offset approach by generating both an extended runway centerline and an instrument landing approach line on display. In one embodiment, extended runway centerline and ILS approach line are displayed such that they are easily discernable from each other (e.g. differing colors, line thicknesses, solid lines verses dashed lines). Information provided to a flight crew by view of one embodiment of the present invention includes the existence of the offset approach, visual display of the true runway centerline, and a visual indication of the degree of the offset between the ILS approach and the runway centerline.

The processing unit 1150 may comprise, or be associated with, any suitable number of additional conventional electronic components including, but not limited to, various combinations of microprocessors, flight control computers, navigational equipment, memories, power supplies, storage devices, interface cards, and other standard components known in the art. Furthermore, processing unit 1150 may include, or cooperate with, any number of software programs (e.g., avionic display programs) or instructions designed to carry out the various methods, process tasks, calculations, and control/display functions described below. During operation of the display device 1180, the processing unit 1150 continuously obtains and processes current external conditions and current ownship state data indicative of the predicted tracking angle, roll, pitch and yaw of the ownship. In certain embodiments, processing unit 1150 may also present suggested corrective actions on display device 1180.

Memory 1155 can be external to and operatively coupled to processing unit or, instead, in integrated into processing unit 1150. In one embodiment, a processor and memory of the processing unit 1150 reside in an Application Specific Integrated Circuit ("ASIC"). Memory 1155 may store data, such as various software or firmware, supporting operation of processing unit 1150 and other components included in display device 1180, such as graphics system, sensor system, and the source of ownship state data. Additionally, the memory 1155 may store one or more onboard databases or be connected to the database 1140. Onboard the ownship, the database 1140 can include a navigational database, a terrain database, a weather database, a historical trend database, and/or a runway database, such as an Enhanced Ground Proximity Warning System ("EGPWS") runway database.

The processing unit 1150 and a graphics unit 1175 cooperate to display, render, or otherwise convey one or more graphical representations, synthetic displays, graphical icons, visual symbology, or images associated with operation of an ownship display system 1190 on display device 1180. An embodiment of a display system 1190 may utilize existing graphics processing techniques and technologies in conjunction with graphics unit 1175. Graphics unit 1175 is suitably configured to support well-known graphics technologies and display techniques including (i) synthetic vision, (ii) enhanced vision, (iii) combined vision, and (iv) compressed attitude.

Display device(s) 1180 may comprise any image-generating device or devices capable of producing one or more navigation displays of the types described herein. As a point of emphasis, the term "display device" encompasses display devices (image-generating devices) fixed to the ownship (A/C) cockpit, as well as Electronic Flight Bags ("EFBs") and other portable display devices that may be carried by a pilot into the cockpit of an A/C and perform the below-described functions. For example, the display device 1180 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the display system 1190 may be implemented with multiple types of a display device 1180, each of which may implement one or more of these different, non-limiting displays.

No matter the number or particular type of display that is used to implement the display device 1180, it was noted above that the display device 1180 is responsive to the image rendering display commands it receives to render various images. The images that the display device 1180 renders will depend, for example, on the type of display being implemented.

The display system 1190 may also consider input data received via user input interface when performing the above-described functions. In this regard, user input interface can include any number and type of input devices suitable for receiving pilot input, which may be distributed throughout the cockpit of an ownship (A/C) and possibly included in other systems or subsystems. In one embodiment, user input interface assumes the form of or includes the alphanumeric keypad of an FMS.

The processing unit 1150 is configured, upon receipt of data and information, continuously processes the information to identify the predictive tracking angle, roll, pitch, and yaw for the ownship A/C, and to generate a symbolic form representative thereof. The symbolic form is an ownship orientation cue to be displayed on the display device 1180, and the dimensions of the symbolic form vary predictably to indicate, respectively, predictive tracking angle, roll, and yaw.

Within sensor system 1210, each sensor of sensor system 1210 may comprise one or more sensor technologies, devices, instruments (such as on-board radar, radar altimeter, a global positioning system (GPS)), and software, sufficient for detecting and providing ownship A/C status data (including speed, location, position, remaining fuel, faults, conditions, and detected weather and temperature).

Referring now to FIG. 10, a process that the display system 1190 may implement is depicted in flowchart form. In the provided embodiment, the processing unit 1150 performs process steps. As can be appreciated in light of the disclosure, the order of the process steps is not limited to the sequential execution illustrated in FIG. 10, rather the process steps may be performed in one or more varying orders as applicable, and in accordance with the present disclosure. As can further be appreciated, one or more steps of the process may be added or removed without altering the spirit of the process.

In addition to the provided steps, the processing unit 1150 may determine that a corrective action is no longer relevant, and remove, from the displayed external environment, the symbol indicating the corrective action upon determining that the corrective action is no longer relevant. Determining that a corrective action is relevant may comprise comparing the current external conditions and current ownship state data with a predetermined caution threshold or a predetermined warning threshold. Each of tracking angle, roll, pitch and yaw may have their respective predetermined caution and warning thresholds. In some embodiments, a user may establish the predetermined caution or warning threshold by entering it via the user input interface.

FIG. 11 also illustrates a system 1200 for accurately displaying lateral deviation symbology in offset ILS approaches of one embodiment of the present invention. System 1200 comprises a display device 1180 of system 1200 adapted for displaying symbolic representations of data, such as, but not limited to ownship, terrain, and runway position information generated by the processing unit 1150. In one embodiment, system 1200 is a Honeywell PRIMUS EPIC integrated avionics systems wherein processing 1150 is a graphic display generation computer, such as the Honeywell Advanced Graphics Module embedded within the Honeywell PRIMUS EPIC system. In one embodiment, display device 1180 is a head-down display, such as a flat panel video display. In other embodiments, display device 1180 is a head-up display (HUD) adapted to project information into a pilot's field of vision.

FIG. 11 also in system 1200 addresses the problems with accurately displaying lateral deviation symbology for offset runway approaches by providing an ownship flight crew graphical representations of both the ILS approach line for a runway and the runway's centerline together with a graphical representation of the ownship's location with respect to the ILS approach line and the runway's centerline. Additionally, system 1200 graphically illustrates for the flight crew the point where the ownship should stop following the ILS approach line, and start aligning with the runway's centerline for landing.

The processing unit 1150 is adapted to perform real-time computations necessary for generating conformal perspective view graphical representations of an ownship's position with respect to other objects of interest. As used in this application, a conformal video display is characterized as having the ability to present information using a set of symbols that are conformal with the outside environment (e.g. having perspective, proportions and relationships that are true to reality.) The processing unit 1150 is connected to flight management systems (FMS) 1160 for obtaining ownship parameters such as ownship position and attitude. In one embodiment, FMS 1160 obtains ownship position and attitude from sensor system 1210 such as GPS sensor and inertial navigation system (INS). FMS 1160 further comprises one or more flight management system databases 1140 adapted to provide processing unit 1150 with data necessary to generate accurate graphical representations of one or more of airport runways, airport runway centerlines, and ILS beacon positions. In one embodiment, processing unit 1150 is adapted to uplink data necessary to generate accurate graphical representations of one or more of airport runways, airport runway centerlines, and ILS beacon positions. The processing unit 1150 is also connected to ILS receiver (not shown) for receiving ILS signals transmitted by airport ILS systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assessing misalignment when landing an ownship, the method comprising:
    displaying an alignment symbol on a display for aiding in a first instance, aligning a tracking angle and a lateral course of the ownship with a runway course by a pilot, and in a second instance, displaying as a cue of misalignment of the ownship from the runway course to the pilot wherein the alignment symbol is configured for viewing as a first display item on a zero-pitch reference line (ZPRL) in a viewpoint of the pilot of a direct line of sight of the pilot on the display;
    displaying a heading bug on the display for aiding in aligning a heading of the ownship with a runway course for the pilot, the heading bug is configured for viewing as a second display item on the ZPRL in the direct line of sight of the pilot, wherein the heading bug indicates, by an approximate position to the alignment symbol on ZPRL of the display, a reference of a magnitude of lateral misalignment;
    displaying a tracking bug on the display for aiding in aligning a track angle of the ownship with the runway course, the tracking bug is configured for viewing as a third display item on the ZPRL in the direct line of sight of the pilot on the display wherein the tracking bug indicates, by an approximate position to the alignment symbol on the ZPRL of the display, a reference of a magnitude of angular misalignment;
    enabling a pilot to use the first, second and third display items for maneuvering the ownship for maintaining first, an alignment of the heading with the runway course and second, for attempting an aligning of the tracking angle of the ownship with the runway course by making adjustments in maneuvers of the ownship in a course of landing while viewing in the direct line of sight the first, second and third display items on the ZPRL of the display wherein a relative position of each of the display items to the other serves as an indicator to the pilot of adjustments needed for correcting the lateral and angular misalignment in the course of landing; and
    prioritizing a display of the first, second, and third runway items in a manner not to obscure other symbols or items on the display deemed to have a higher priority for viewing by pilot for maneuvering the ownship.

2. The method of claim 1, further comprising:
    configuring the first display item with a framework for indicating on the display to the pilot, the maneuvering of the ownship for the maintaining of the heading with the runway course wherein the maintaining of the heading in alignment with the runway course is displayed when the second display item is positioned within the framework of the first display item.

3. The method of claim 1, further comprising:
    configuring the third display item with a horizontal tracking angle trend line extending from the third display item for indicating angular displacement and further in response to maneuvers of the ownship, indicating changes in magnitude on the display by the horizontal tracking angle trend line wherein when both the third display item and the horizontal tracking angle trend line are displayed within the framework of the first display item, a visual indication of a safe condition is viewed by the pilot in the course of landing.

4. The method of claim 3, wherein the horizontal tracking angle trend line further comprising:
    indicating on the display by an extension or abridgment of the horizontal tracking trend line, the magnitude of the changes in angular displacement resulting from the maneuvers of the ownship by the pilot.

5. The method of claim 3, wherein the horizontal tracking angle trend line further comprising:
    indicating on the display, by an extension or an abridgment of the horizontal tracking trend line, a predicted change in the tracking angle of the ownship wherein when the extended horizontal tracking angle trend line with either the extension or abridgment is within the framework of the first display item, the predicted tracking angle of the ownship is within a range of a safe condition for landing.

6. The method of claim 1 further comprising:
    configuring the first runway symbol into a first portion and a second portion on the display wherein when the third runway item is positioned within the first portion there is indicated an alignment of the tracking of the ownship and when the third runway item is positioned in the second portion there is indicated a misalignment of the tracking of the ownship.

7. A cockpit display system for use onboard an ownship, the cockpit display system comprising:
    a sensor system, configured to detect external conditions;
    a source of ownship flight data;
    a processor, communicatively coupled to the sensor system, the source of ownship flight data, and a cockpit display, the processor configured to process the external conditions and ownship flight data to:
    generate on the cockpit display an alignment symbol on a zero-pitch reference line (ZPRL) to aid in a first instance, to align to a tracking angle and a lateral course of the ownship with a runway course by a pilot, and in a second instance, to display as a cue of misalignment of the ownship from the runway course to the pilot;
    display on the cockpit display a heading bug to aid to align a heading of the ownship with a runway course for the pilot wherein the heading bug indicates, by an approximate position to the alignment symbol on the ZPRL of the cockpit display, a reference of a magnitude of lateral misalignment;
    display on the cockpit display a tracking bug to aid to align a track angle of the ownship with the runway course wherein the tracking bug indicates, by an approximate position to the alignment symbol on the ZPRL of the display, a reference of a magnitude of angular misalignment; and
    enable a pilot to use the alignment symbol, heading bug and track bug to maneuver the ownship to maintain first, an alignment of the heading with the runway course and second, to attempt to align the tracking angle of the ownship with the runway course by making adjustments in maneuvers of the ownship in a course of landing while viewing the alignment symbol, heading bug and track bug on the ZPRL of the cockpit display wherein a relative position of each other serves as an indicator to the pilot of adjustments needed to correct the lateral and angular misalignment in the course of landing.

8. The display system of claim 7, wherein the processor further comprising:
to configure the alignment symbol with a framework to indicate on the display to the pilot how to maneuver the ownship to maintain the heading with the runway course wherein to maintain the heading in alignment with the runway course, the heading bug is positioned within the alignment symbol on the cockpit display by the maneuver of the ownship.

9. The display system of claim 7, wherein the processor further comprising:
to configure the track bug with a horizontal track angle trend line extension to indicate angular displacement and further to be responsive to maneuvers of the ownship indicated by changes in magnitude on the cockpit display of the horizontal track angle trend line extension wherein when both the track bug and the horizontal track angle trend line extension are displayed within the framework of the alignment symbol, to view by the pilot an visual indication of a safe condition in the course of landing.

10. The display system of claim 9, wherein the processer further comprising:
to indicate on the cockpit display by a further extension or abridgment in the horizontal tracking trend line extension, the magnitude of the changes in angular displacement which result from maneuvers of the ownship by the pilot.

11. The display system of claim 10, wherein the processer further comprising:
to indicate on the cockpit display by a further extension or abridgment in the horizontal tracking trend line extension, a predicted change in the track angle of the ownship wherein when the extension of the horizontal track angle trend line extension is within the framework of the alignment symbol, the predicted track angle of the ownship is within a range of a safe condition for landing.

12. The display system of claim 7, wherein the processor further comprising:
to configure the alignment symbol into a first portion and a second portion on the cockpit display wherein when the track bug is positioned within the first portion there is indicated an alignment of the track of the ownship and when the track bug is positioned in the second portion there is indicated a misalignment of the track of the ownship.

13. The display system of claim 7, wherein the processor further comprising:
to prioritize on the cockpit display, the display of the alignment symbol, track bug, and heading bug so as not to obscure other symbols or items on the cockpit display to have deemed with a higher priority to view by the pilot to maneuver the ownship.

14. The display system of claim 7, wherein the sensor system comprises one or more of on-board radar, a radar altimeter, and a global positioning system (GPS).

15. The display system of claim 7, wherein a maneuver for an alignment comprises an indication of a need by the pilot of one or more of: a sideslip, crabbing, de-crabbing, and right or left rudder action.

16. A method for presenting information on a display system for use onboard an ownship, the method comprising:
detecting, by a sensor system, external conditions;
receiving, from a source of ownship flight data; and
at a processor, communicatively coupled to the sensor system, the source of ownship flight data, and a display device, the processor configured to process the external conditions and ownship flight data to:
generate on a cockpit display an alignment symbol to aid to align a track angle and lateral deviation of the ownship with a runway course by a pilot;
generate a track bug and a heading bug on the cockpit display to aid to align to a track and a heading of the ownship with the runway course; and
enable a pilot to view the alignment symbol, the track bug and the heading bug and to maneuver the ownship to maintain first, an alignment of the heading to the runway course and second, to attempt to align the track angle of the ownship with the runway course by adjustments made to maneuver the ownship in a course of landing by a view of a relative position of each of the alignment symbol, the track bug, the heading bug to each other to serve as an indicator to the pilot of adjustments needed in the course of landing.

17. The method of claim 16, the processor further comprising:
to configure the alignment symbol to indicate on the cockpit display to the pilot how to maneuver the ownship to maintain the heading with the runway course wherein to maintain the heading in alignment with the runway course, the heading bug is positioned within the alignment symbol on the cockpit display by the maneuver of the ownship.

18. The method of claim 17, the processor further comprising:
use on the cockpit display, the alignment symbol which has been generated as a cue to aid in a time to align a track angle or a heading maneuver of the ownship with a runway course for the pilot, wherein the cue indicates a reference time for a touchdown.

19. The method of claim 18, wherein the relative position of each of the track bug, heading bug and alignment symbol to each other to serve as an indicator to the pilot of adjustments needed to correct for lateral and angular deviations in the course of landing.

* * * * *